US008542997B2

(12) United States Patent
Pincemin et al.

(10) Patent No.: US 8,542,997 B2
(45) Date of Patent: Sep. 24, 2013

(54) HIGH BIT RATE BIDIRECTIONAL PASSIVE OPTICAL NETWORK, ASSOCIATED OPTICAL EXCHANGE AND LINE TERMINATION DEVICE

(75) Inventors: Erwan Pincemin, Gommenec'h (FR); Naveena Genay, Lannion (FR)

(73) Assignee: France Telecom, Paris (FR)

( * ) Notice: Subject to any disclaimer, the term of this patent is extended or adjusted under 35 U.S.C. 154(b) by 537 days.

(21) Appl. No.: 12/664,436

(22) PCT Filed: Jun. 18, 2008

(86) PCT No.: PCT/FR2008/051081
§ 371 (c)(1), (2), (4) Date: Feb. 10, 2010

(87) PCT Pub. No.: WO2009/004244
PCT Pub. Date: Jan. 8, 2009

(65) Prior Publication Data

US 2010/0142950 A1 Jun. 10, 2010

(30) Foreign Application Priority Data

Jun. 19, 2007 (FR) ..................................... 07 55853

(51) Int. Cl.
*H04J 14/00* (2006.01)

(52) U.S. Cl.
USPC .............................. 398/67; 398/142; 398/150

(58) Field of Classification Search
USPC ........................................... 398/140–167, 67
See application file for complete search history.

(56) References Cited

U.S. PATENT DOCUMENTS

| | | | | |
|---|---|---|---|---|
| 2003/0007216 | A1* | 1/2003 | Chraplyvy et al. | 359/161 |
| 2004/0086225 | A1* | 5/2004 | Kim et al. | 385/31 |
| 2005/0047797 | A1* | 3/2005 | Lee et al. | 398/183 |
| 2005/0058461 | A1* | 3/2005 | Lee et al. | 398/198 |

FOREIGN PATENT DOCUMENTS

| | | |
|---|---|---|
| EP | 1 271 808 A2 | 1/2003 |
| EP | 1 696 588 A1 | 8/2006 |

OTHER PUBLICATIONS

Bissessur et al., "1.6 Tbit/s (40×40 Gbit/s) DPSK transmission over 3×100 km of TeraLight fibre with direct detection," Electronics Letters, vol. 39 (2), pp. 192-193, IEE Stevenage, GB (Jan. 23, 2003).

(Continued)

*Primary Examiner* — Dzung Tran

(74) *Attorney, Agent, or Firm* — Drinker Biddle & Reath LLP

(57) ABSTRACT

The invention relates to a passive optical network comprising an optical exchange linked by at least one optical fiber to at least one line termination device of said network, able to transmit a downlink optical signal phase-modulated in NRZ-DPSK format and to receive an uplink optical signal. According to the invention, said line termination device comprises means of converting the transmitted downlink optical signal phase-modulated in NRZ-DPSK format into an optical data signal amplitude-modulated in duobinary modulation format and means of generating an uplink optical signal phase-modulated in NRZ-DPSK format from the downlink optical signal phase-modulated in NRZ-DPSK format. The optical exchange is able to convert the uplink optical signal phase-modulated in NRZ-DPSK format into an optical data signal amplitude-modulated in duobinary modulation format.

8 Claims, 4 Drawing Sheets

(56) References Cited

OTHER PUBLICATIONS

Genay et al., "Bidirectional WDM/TDM-PON access networks integrating downstream 10Gbit/s DPSK and upstream 2.5 Gbit/s OOK on the same wavelength," Proceedings of the European Conference on Optical Communication, pp. 1-2 (2006).

Gnauck et al., "Optical Duobinary Format From Demodulation of DPSK Using Athermal Delay Interferometer," IEEE Photonics Technology Letters, vol. 18 (4), pp. 637-640 (Feb. 15, 2006).

Royset et al., "Novel Dispersion Tolerant Optical Doubinary Transmitter Using Phase Modulator and Bragg Grating Filter," ECOC, pp. 225-226 (Sep. 1998).

Takesue et al. "Wavelength Channel Data Rewrite Using Saturate SOA Modulator for WDM Networks With Centralized Light Sources," Journal of Lightwave Technology, vol. 21 (11), pp. 2546-2556 (Nov. 2003).

* cited by examiner

HIGH BIT RATE BIDIRECTIONAL PASSIVE OPTICAL NETWORK, ASSOCIATED OPTICAL EXCHANGE AND LINE TERMINATION DEVICE

CROSS-REFERENCE TO RELATED APPLICATIONS

This application is the U.S. national phase of the International Patent Application No. PCT/FR2008/051081 filed Jun. 18, 2008, which claims the benefit of French Application No. 07 55853 filed Jun. 19, 2007, the entire content of which is incorporated herein by reference.

FIELD OF THE INVENTION

The invention relates to the field of optical access networks and, more particularly, the field of passive optical access networks or PON (Passive Optical Networks).

BACKGROUND OF THE INVENTION

Access networks are networks that are costly to the telecommunications operators because they are more often than not tree-structured networks serving numerous subscribers. Such networks are equipped with numerous components that often consume electrical energy. In order to limit these operating costs while improving the quality of the services offered to the subscribers, the operators have developed passive optical access networks. All the components located in the network between the optical exchange and the user equipment are passive, that is to say that they do not need to be electrically powered to function.

Such optical networks offer subscribers a high connection bit rate of the order of 2.5 Gbit/s (Gigabits per second). These bit rates make it possible to offer services such as high definition television, Internet or even videophony, so meeting a demand from the subscribers.

They are currently implemented for the deployment of high bit rate access to the homes of residential subscribers of FTTH (Fiber To The Home) type.

A passive optical network of bidirectional PON type is known from the document entitled "Bidirectional WDM/TDM-PON access Networks integrating downstream 10 Gbits/s DPSK and upstream 2.5 Gbits/s OOK on the same wavelength", by Genay et al, published as paper Th3.6.6 at the European Conference on Optical Communications (ECOC) 2006, held in Cannes, France. Such an optical access network 1 comprises, with reference to FIG. 1, an optical exchange 10 linked by a bidirectional optical fiber 20 to a 1-to-N distribution element 30, N being an integer greater than or equal to 1, able to distribute a downlink optical signal to N line termination devices $\mathbf{50}_1$ to $\mathbf{50}_N$ and to multiplex N uplink optical signals transmitted by the N line termination devices $\mathbf{50}_1$ to $\mathbf{50}_N$ to the optical exchange 10. The distribution element is linked to the line termination devices $\mathbf{50}_1$ to $\mathbf{50}_N$ by N optical fibers $\mathbf{40}_1$ to $\mathbf{40}_N$. To each line termination device one or more subscribers can be connected.

The optical exchange 10 comprises means 11 of transmitting an optical signal, generally a laser used to convey information addressed to one or more subscribers, means 12 of receiving an uplink optical signal originating from the subscribers and a circulator 13, able to make the downlink and uplink optical signals circulate in the single optical fiber 20.

The line termination device $\mathbf{50}_i$ comprises a circulator $\mathbf{51}_i$ able to make the downlink $SO_{D,ri}$ and uplink $SO_R$ optical signals circulate in the bidirectional optical fiber $\mathbf{40}_i$. It also comprises coupling means $\mathbf{52}_i$ able to distribute the optical power of the received downlink optical signal $SO_{D,ri}$ between a first $SO_{D,ri1}$ and a second $SO_{D,ri2}$ received downlink optical signal. The first received downlink optical signal $SO_{D,ri1}$ is processed by reception means $\mathbf{53}_i$ for decoding. The second received downlink optical signal $SO_{D,ri2}$ is processed by means $\mathbf{54}_i$ of generating an uplink optical signal $SO_{Ri}$ from the received downlink optical signal $SO_{D,ri}$.

The passive optical network described previously uses the principle of time-division multiplexing or TDM. In such a network, the optical signal transmitted by the laser 10 is divided up into a plurality of time slots of the same duration. Each time slot is then associated with one of the line termination devices $\mathbf{50}_i$ according to their requirements.

There are also passive optical networks that use wavelength division multiplexing or WDM. In such a network, the optical exchange comprises a plurality of lasers each transmitting an optical data component associated with a wavelength that is specific to them. An optical multiplexer placed at the output of the optical exchange and to which is connected a first end of the main fiber of the network is used to inject into the latter a wavelength-division multiplexed signal. In such an optical network, each line termination device is associated with an optical component obtained from the optical exchange and therefore with a particular wavelength.

The passive optical access networks, whether they use time-division multiplexing or wavelength-division multiplexing, offer a conventional range of the order of 20 km (kilometers). This limited range of the network results from the fact that, in the passive optical networks, the various optical components that are, for example, the optical couplers, the optical multiplexers or the optical fibers, bring about optical power losses in the signals passing through the network and that the transmitted signals cannot be amplified without constraints to compensate such losses. In practice, in a passive optical network, the downlink optical signals, that is to say the optical signals transmitted by the exchange to the subscribers, and the uplink optical signals, that is to say the optical signals transmitted by the subscriber equipments to the optical exchange, are conveyed by a single optical fiber. This reduces the cost of the network. However, the use of a single optical fiber to convey the downlink and uplink optical signals introduces constraints on the transmission power levels of these optical signals.

Notably, it is essential on the one hand for the transmission power of the data signals to be sufficient to compensate the losses associated with crossing the network and thus allow for correct reception. It is also essential for the power not to be high to the point of generating backscattered signals that could dazzle the reception means used to detect the signals being propagated in the subscriber-exchange direction. The result of this trade-off on the value of the transmit optical power of the signals in a passive optical network is reflected in a limited network range.

One current trend is to increase the transmission bit rate in the passive optical access networks beyond 10 Gbit/s, to 40 Gbit/s. Such an increase in bit rate leads to an increase in the distortions that are undergone by the signals transmitted through the optical access network. These distortions, that are emphasized with the bit rate, include the phenomenon of chromatic dispersion (CD). Given a constant range (therefore given constant aggregate chromatic dispersion), the impact of the chromatic dispersion is multiplied by 16 for a bit rate multiplied by 4.

The solutions of the prior art consist in introducing modules for compensating the in-line chromatic dispersion. A first drawback of such devices is that they are costly. A second drawback is that they are therefore unsuited to an access network of PON type, because the line termination devices are not necessarily all located at the same distance from the optical exchange (it would require a compensation specific to each customer for everything to be perfect).

Thus, there is a need to compensate the chromatic dispersion introduced upon the transmission of optical signals over a high-bit rate passive optical network, typically 10 Gbit/s and beyond, while maintaining the passive nature of such a network.

SUMMARY OF THE INVENTION

The invention meets this need by proposing a passive optical network comprising an optical exchange linked by at least one optical fiber to at least one line termination device of said network, said exchange comprising means of transmitting a downlink optical data signal phase-modulated in NRZ-DPSK format and means of receiving an uplink optical signal, said line termination device comprising coupling means able to divide the optical power of the transmitted downlink optical signal so as to obtain a first and a second downlink optical signal, means of receiving said first downlink optical signal and means of generating and transmitting an uplink optical signal from the second downlink optical signal.

The passive optical network according to the invention is characterized in that:

- said line termination device comprises first means of converting said first downlink optical signal phase-modulated in NRZ-DPSK format into an optical data signal amplitude-modulated in duobinary modulation format, said first reception means being able to receive said second amplitude-modulated downlink optical signal;
- said means of generating and transmitting the uplink optical signal being able to generate and transmit an uplink optical signal phase-modulated in NRZ-DPSK format from said second downlink optical signal;
- said optical exchange comprises, prior to said second reception means, second means of converting said uplink optical signal phase-modulated in NRZ-DPSK format into an optical data signal amplitude-modulated in duobinary modulation format, said second reception means being able to receive said amplitude-modulated uplink optical signal.

According to the invention, the downlink and uplink optical signals transmitted in the line fiber are in NRZ-DPSK format. This phase modulation format offers the first advantage of limiting the backscattering power level introduced by the nonlinear Brillouin effect. Such an effect appears only when the transmit power of the optical signals transmitted in the line fiber exceeds a certain threshold. As an example, it has been observed that the passive optical network according to the invention makes it possible to push back such a threshold by several dB compared to the prior art.

A second advantage of the passive optical network according to the invention is that it is suited to remodulation in the customer's home, because of its constant amplitude.

The compensation of the chromatic dispersion introduced on the transmission in the optical fiber is provided, according to the invention, on the reception of transmitted downlink optical signal at the line termination device. More specifically, the received downlink optical signal is converted into an amplitude-modulated signal in duobinary format. This format is in practice particularly resistant to the build-up of chromatic dispersion for two main reasons:

- it offers a narrow spectrum;
- it combines amplitude modulation and phase modulation.

Now, it is known that the chromatic dispersion acts in a differentiated way on the constituent wavelengths of a spectrum, by phase shifting the wavelengths all the more as they become more distant from one another. For example, for a standard fiber 100 km long, the chromatic dispersion is 1700 ps/nm, when the extreme rays of the spectrum are 1 nm apart and 3400 ps/nm when they are 2 nm apart. Reducing the spectral footprint of the signal transmitted to the subscriber module therefore considerably increases the resistance to chromatic dispersion.

It will be noted that the use of the duobinary format is known in the field of long-haul transport networks, but that, in such networks, the conversion is done at the transmitting exchange, not in the line termination device.

It follows that the passive optical network according to the invention generates, at 40 Gbit/s, a level of chromatic dispersion equivalent to that generated by a passive optical network according to the prior art at 10 Gbit/s. Consequently, such a passive optical network makes it possible to compensate the chromatic dispersion induced by an increase in bit rate.

Furthermore, the converted downlink optical signal can be processed by the same reception means of the line termination device as those according to the prior art.

Since the passive optical network according to the invention is bidirectional, the line termination device is able to send an uplink optical signal to the optical exchange. In a known manner, such an optical signal is generally generated by remodulation of the received downlink optical signal, which makes it possible to avoid having to use a laser in the customer's home. Such a generation is generally done by remodulating a phase-modulated downlink optical signal into an amplitude-modulated uplink optical signal.

According to the invention, the uplink optical signal obtained from the received downlink optical signal is phase-modulated in NRZ-DPSK format, so as to be able to apply to it, at the optical exchange, a conversion of the same type as that applied to the downlink optical signal at the line termination device. The means of receiving the uplink optical signal at the optical exchange of the passive optical network according to the invention are therefore suitable for receiving optical signals phase-modulated in NRZ-DPSK format.

According to another aspect of the invention, the downlink optical signal having a given basic bit rate, said first and second conversion means comprise a Gaussian filtering stage whose mid-height width falls within a range of values corresponding to a percentage of between 50% and 65% of said basic bit rate.

This is a narrow Gaussian filtering stage which makes it possible, when it is applied to the downlink or uplink optical signal in NRZ-DPSK format, to considerably reduce the spectral footprint of this signal and make it three to four times more resistant to the chromatic dispersion built up in the passive optical network PON than the optical signal in the NRZ-DPSK format.

Such Gaussian filtering can be produced in the optical domain by a filter of FBG (Fiber Bragg Grating) type, which is very simple to produce and inexpensive.

It will be noted that, in the field of long-haul transport networks, the conversion of a signal in duobinary format is generally done by filtering a sequence of binary data of the transmitted optical signal, in the electrical domain, from a fifth order low-pass Bessel filter.

Preferentially, the adjustment range is between 56% and 60%.

According to another aspect of the invention, said means of generating and transmitting an uplink optical signal phase-modulated in NRZ-DPSK format from said second received downlink optical signal phase-modulated in NRZ-DPSK format comprise means of cleaning the phase of said second downlink optical signal, means of amplifying the cleaned downlink optical signal, phase-modulation means able to supply said uplink optical signal phase-modulated in NRZ-DPSK format and three-branch circulation means, able to receive said second downlink optical signal over a first branch, to send said second downlink optical signal to said phase cleaning means via a second branch, to receive the uplink optical signal generated on a third branch and send it over said optical fiber.

The benefit of the generation means according to the invention lies in the reuse of the downlink optical signal from the optical exchange in the line termination module in the subscriber's home to produce an uplink optical signal, by exploiting the constant amplitude of the downlink optical signal phase-modulated in NRZ-DPSK format. Such means are capable of remodulating the downlink optical signal, so as to avoid having to use an additional laser in the home of each customer of the PON network.

It will be noted that, while it is well known to those skilled in the art to remodulate a downlink optical signal to generate an uplink optical signal, the remodulation that is carried out is generally an amplitude remodulation and not a phase remodulation. The advantage of phase remodulation is that it makes it possible to generate an uplink optical signal phase-modulated in NRZ-DPSK format, and apply to it, at the optical exchange, the same chromatic dispersion compensation as to the downlink optical signal.

According to yet another aspect of the invention, said optical exchange comprises first means of amplifying the optical power of the downlink optical signal, able to transmit a first downlink amplification signal in said optical fiber;

- said optical fiber comprises at least one first passive amplification medium able to be excited by said first amplification signal;
- said passive optical network comprises second means of amplifying the optical power of the downlink optical signal, able to transmit a second uplink amplification signal in said optical fiber;
- said optical fiber comprises a second amplification medium able to be excited by said second amplification signal.

According to this aspect of the invention, the passive optical network implements remotely-situated amplification means which, by amplifying the optical signals transported by the optical fiber, in the downlink direction as in the uplink direction, make it possible to increase the range of the passive optical network, while retaining its passive nature.

Such a passive optical network makes it possible, on the one hand, to compensate the increase in chromatic dispersion induced by an increase in the transmission bit rate and, on the other hand, to meet a need to increase the range of the passive optical networks to be able to serve subscribers located in rural areas. In practice, while the range of the passive optical access networks according to the prior art is sufficient in urban areas where the subscribers are located at relatively short distances from the optical exchanges, of the order of 5 to 10 km, such is not the case for subscribers located in rural areas. In these areas, the subscribers are often geographically dispersed and are therefore more often than not located at a distance from the optical exchanges greater than the conventional range of a passive optical network. These subscribers cannot therefore benefit from the high bit rate transmission offered by the passive optical networks and consequently from the services offered that require a high bit rate connection.

Moreover, it is known that the phenomenon of chromatic dispersion is emphasized, not only with an increase in the transmission bit rate, but also with an increase in the range of an optical network. Consequently, for a passive optical access network of greater range, for example 100 km, the phenomenon of chromatic dispersion becomes problematic at far lower bit rates than for a PON of conventional range, typically from 10 Gbit/s. It would then appear particularly advantageous to combine range increase with chromatic dispersion compensation in a passive optical network.

The invention also relates to an optical exchange linked by at least one optical fiber to at least one line termination device in a passive optical network, said exchange comprising first means of transmitting a downlink optical data signal phase-modulated in NRZ-DPSK format and second means of receiving an uplink optical signal transmitted by said at least one line termination device.

According to the invention, said optical exchange is characterized in that, the uplink optical signal being phase-modulated in NRZ-DPSK format, said exchange comprises, prior to said second reception means, second means of converting said uplink optical signal phase-modulated in NRZ-DPSK format into an optical data signal amplitude-modulated in duobinary modulation format, said reception means being able to receive said uplink optical signal amplitude-modulated in duobinary modulation format.

The invention further relates to a line termination device in a passive optical network comprising an optical exchange linked by at least one optical fiber to said line termination device of said network, said exchange comprising first means of transmitting a downlink optical data signal phase-modulated in NRZ-DPSK format and second means of receiving an uplink optical signal, said line termination device comprising coupling means able to divide the optical power of the transmitted downlink optical signal so as to obtain a first and a second transmitted downlink optical signal, first means of receiving said first downlink optical signal and second means of generating and transmitting an uplink optical signal from said second downlink optical signal.

According to the invention, said line termination device is characterized in that it comprises means of converting said first transmitted downlink optical signal phase-modulated in NRZ-DPSK format into an optical data signal amplitude-modulated in duobinary modulation format, said first reception means being able to receive said amplitude-modulated downlink optical signal; and in that said means of generating and transmitting an uplink optical signal are able to generate and transmit an uplink optical signal phase-modulated in NRZ-DPSK format from said second received downlink optical signal.

The invention also relates to a method of transmitting a downlink optical signal and receiving an uplink optical signal in a passive optical network comprising an optical exchange linked by at least one optical fiber to at least one line termination device of said network, said method comprising a step for transmitting a downlink optical data signal phase-modulated in NRZ-DPSK format and a step for receiving an uplink optical signal.

According to the invention, such a method is characterized in that it comprises, prior to the step for reception of an uplink optical signal, a step for conversion of said uplink optical signal phase-modulated in NRZ-DPSK format into an uplink optical signal amplitude-modulated in duobinary modulation format.

The invention finally relates to a method of receiving a downlink optical signal and transmitting an uplink optical signal in a passive optical network comprising an optical exchange linked by at least one optical fiber to at least one line termination device of said network, said method comprising the following steps:

- coupling, intended to divide the optical power of the transmitted downlink optical signal so as to obtain a first and a second downlink optical signal;
- reception of said first downlink optical signal; and
- generation and transmission of an uplink optical signal from said second downlink optical signal.

According to the invention, such a method is characterized in that it comprises a step for conversion of said first transmitted downlink optical signal phase-modulated in NRZ-DPSK format into an optical data signal amplitude-modulated in duobinary modulation format, said amplitude-modulated downlink optical signal being intended to be processed by the reception step, and in that the step for generating and transmitting an uplink optical signal generates and transmits an uplink optical signal phase-modulated in NRZ-DPSK format from said second received downlink optical signal.

BRIEF DESCRIPTION OF THE DRAWINGS

Other benefits and features of the invention will become more clearly apparent on reading the following description of a particular embodiment of the invention, given by way of simple illustrative and nonlimiting example, and from the appended drawings in which.

DETAILED DESCRIPTION

The general principle of the invention relies on compensating the chromatic dispersion on receiving an optical signal transmitted over the optical fiber of the passive optical network according to the invention, on both downlink and uplink channels. Such a compensation is produced by conversion of the phase-modulated signal in NRZ-DPSK format transmitted over the optical fiber into an amplitude-modulated signal in duobinary format, which format is three to four times more resistant to chromatic dispersion than the other formats.

Figure 1:
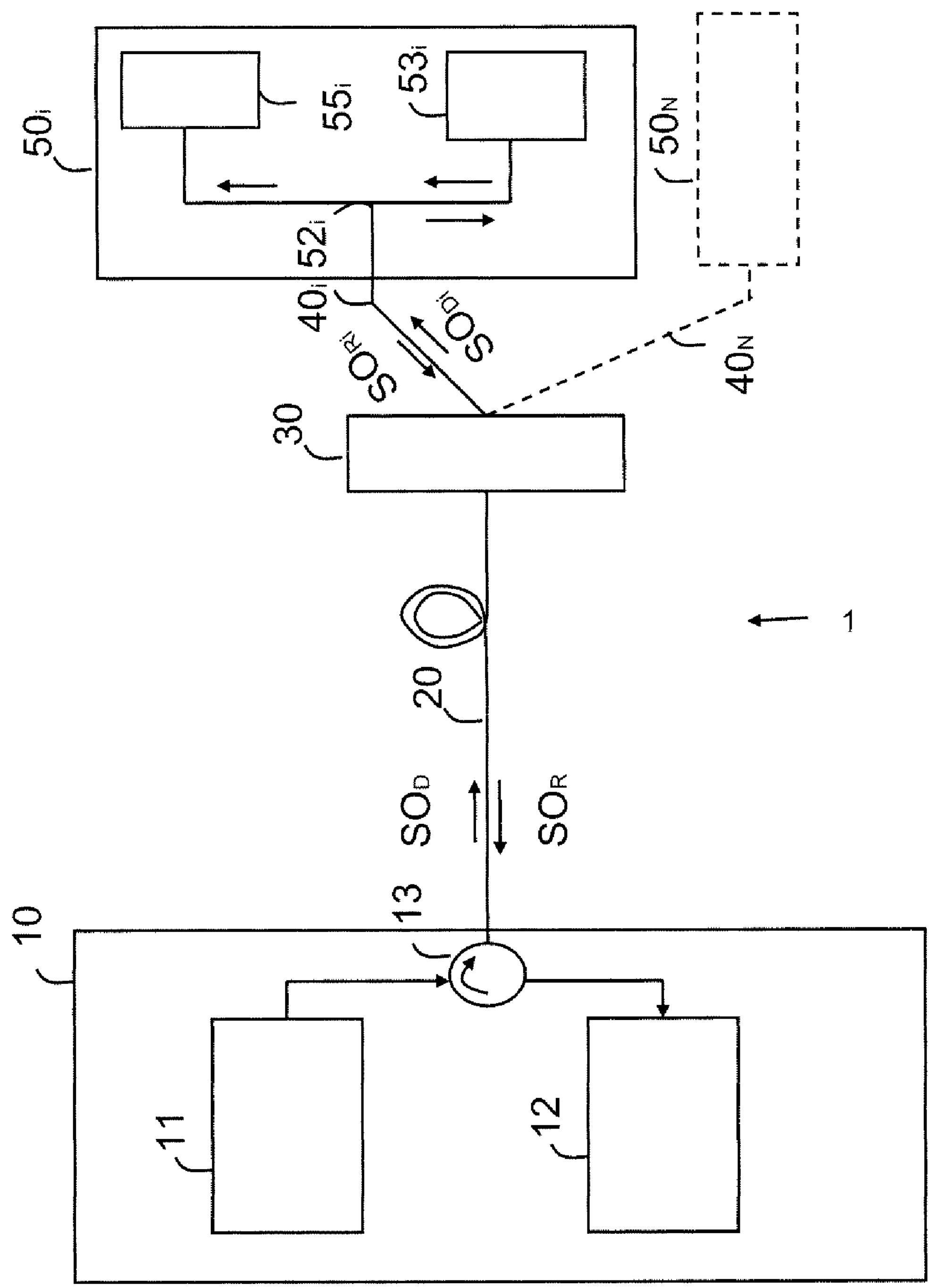
FIG. 1 diagrammatically presents a passive optical access network according to the prior art.
Figure 2:
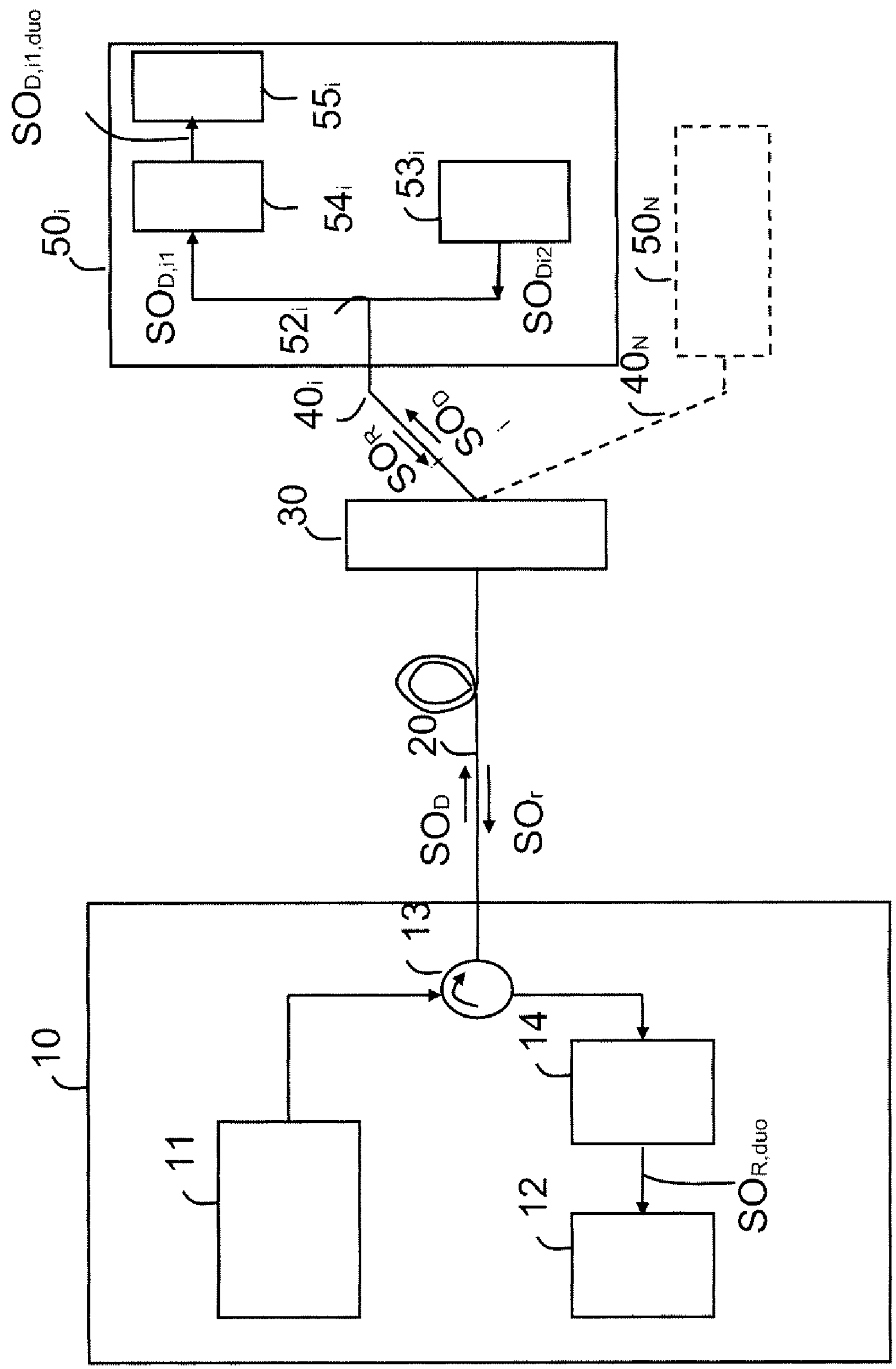
FIG. 2 diagrammatically presents a high bit rate passive optical access network according to the invention.

Referring to FIG. 2, an optical access network 1 according to the invention is presented. Such a network 1 is suitable for data transmission at a basic bit rate of 10 Gbit/s or more. It comprises an optical exchange 10 linked by a bidirectional optical fiber 20 to a 1-to-N distribution element 30, N being an integer greater than or equal to 1, able to distribute a downlink optical signal to N line termination devices $\mathbf{50}_1$ to $\mathbf{50}_N$ and to multiplex N uplink optical signals transmitted by the N line termination devices $\mathbf{50}_1$ to $\mathbf{50}_N$ to the optical exchange 10. The distribution element is linked to the line termination devices $\mathbf{50}_1$ to $\mathbf{50}_N$ by N optical fibers $\mathbf{40}_1$ to $\mathbf{40}_N$.

The transmission means 11 of the optical exchange 10 are able to transmit an optical signal $SO_{D,e}$ phase-modulated in NRZ-DPSK format. Such a signal exhibits a constant amplitude.

The optical exchange 10 further comprises means 11 of transmitting an optical signal $SO_{D,e}$, means 12 of receiving an uplink optical signal $SO_R$ and a circulator 13, second means 14 of converting said received uplink optical signal phase-modulated in NRZ-DPSK format $SO_R$ into an optical data signal amplitude-modulated in duobinary modulation format $SO_{R,duo}$, intended to be presented to the input of said second reception means 12.

The method of transmitting a downlink optical signal and of receiving an uplink optical signal according to the invention, implemented by the optical exchange 10, is also illustrated by FIG. 2.

Preferentially, such conversion means comprise a Gaussian filter, whose mid-height width is located between 50% and 65% of the basic bit rate, the optimum adjustment range being between 56% and 60%. For example, for a basic bit rate of 10 Gbit/s, its mid-height width is between 5 GHz and 6.5 GHz, the optimum adjustment range being between 5.6 GHz and 6 GHz. The duobinary optical signal, obtained by narrow Gaussian filtering of the NRZ-DPSK signal, is far more robust to inter-symbol interference (IES), that is provoked by the chromatic dispersion. The duobinary format obtained is described in more detail in the article entitled "*Performance comparison of Duobinary Modulation Formats for* 40 *GBs Long-Haul WDM Transmissions*", by Tan et al, published for the ECOC conference, which was held in Cannes, France in September 2006.

Such a format offers a double modulation:

- amplitude modulation which carries the information conveyed by the optical signal;
- phase modulation which does not carry information but which gives this format interesting properties of robustness to IES.

It is the combination of the narrow spectrum and the superimposition of the amplitude modulation on the phase modulation that gives it a very good resistance to chromatic dispersion.

It will, however, be noted that the conversion of the optical signal phase-modulated in NRZ-DPSK format into a signal amplitude-modulated in duobinary format can also be implemented by other filtering means, for example a Mach-Zehnder Delay Interferometer (MZDI) filter. Such a filter is then configured to introduce a delay of one bit time on the optical signal and supply at the output the sum of the optical signal and of the same optical signal delayed by one bit time. The tests carried out in the laboratory however highlight a far greater capacity on the part of the Gaussian filter to compensate the chromatic dispersion.

Another benefit of such a conversion lies in the fact that the duobinary format has a restricted spectral occupancy. Now, the chromatic dispersion acts differently on the various component wavelengths of a spectrum, notably it distorts the signal all the more as the rays of the spectrum become more distant. It follows that restricting the spectral occupancy has the effect of reducing the impact of the chromatic dispersion on the transmitted optical signal, hence the interest in the duobinary format.

It will be noted that, in this range of values of 50 to 65% of the basic bit rate, the range from 56 to 60% leads to optimum results in terms of reducing the chromatic dispersion on the transmitted optical signal.

The duobinary signal obtained is presented to the reception means 12 of the optical exchange. It will be noted that such means must simply be adapted to receive optical signals amplitude-modulated in NRZ-OOK (On-Off Keying), the duobinary format not requiring any particular adaptation.

The line termination device $\mathbf{50}_i$ according to the invention comprises, in addition to the circulator $\mathbf{51}_i$ and the coupling means $\mathbf{52}_i$, first means $\mathbf{54}_i$ of converting said first received downlink optical signal phase-modulated in NRZ-DPSK format $SO_{D\,i,1}$ into an optical data signal amplitude-modulated in duobinary modulation format $SO_{D,i,duo}$, intended to be presented to the input of said first reception means $\mathbf{55}_i$.

According to the invention, the generation means $\mathbf{53}_i$ are able to generate an uplink optical signal phase-modulated in NRZ-DPSK format $SO_{Ri,e}$ from said second received downlink optical signal $SO_{Di,2}$ and send it to the circulator $\mathbf{51}_i$ for transmission over the line optical fiber $\mathbf{40}_i$.

The method of receiving a downlink optical signal and transmitting an uplink optical signal implemented by the line termination devices $\mathbf{50}_1$ to $\mathbf{50}_N$ according to the invention is also illustrated by FIG. 2.

Figure 3:
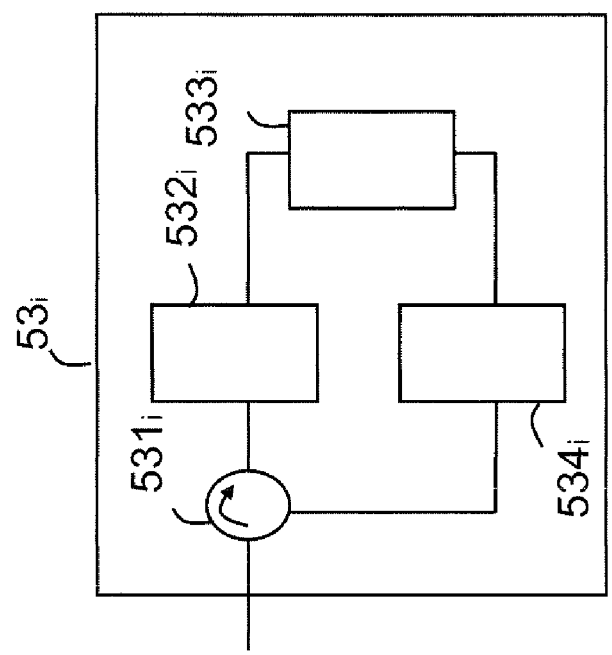
FIG. 3 diagrammatically presents the means of generating an uplink optical signal from a received downlink optical signal according to the invention.

Referring to FIG. 3, the figure shows means $\mathbf{53}_i$ of generating an uplink optical signal $SO_{Ri}$ from the second received downlink signal $SO_{D,i2}$ according to one aspect of the invention. Such means comprise a circulator $\mathbf{531}_i$ able to make the received downlink signals $SO_{D,ri}$ and the transmitted uplink signals $SO_{Ri,e}$ circulate in the line fiber $\mathbf{40}_i$. Via a first branch, the circulator $\mathbf{531}_i$, sends the received downlink optical signal into the phase-cleaning means $\mathbf{532}_i$, typically an electro-absorption modulator (EAM), able to "clean" or delete the phase of the received downlink NRZ-DPSK optical signal. Advantageously, the EAM is polarized at its maximum transmission point, so as to lead to a minimum level of power losses. The signal with constant amplitude, "cleaned" phase-wise, is then sent to amplification means $\mathbf{533}_i$, typically a semiconductor optical amplifier (SOA), in order to compensate the power losses introduced by the transmission in the downlink direction and by the EAM. The amplified signal obtained is presented to the input of phase modulation means $\mathbf{534}_i$, or phase modulator MP, that perform an encoding of the data to be returned to the optical exchange in NRZ-DPSK format. It will be noted that it may be useful to add a second amplifier of SOA type to anticipate the power losses introduced by the MP.

Figure 4:
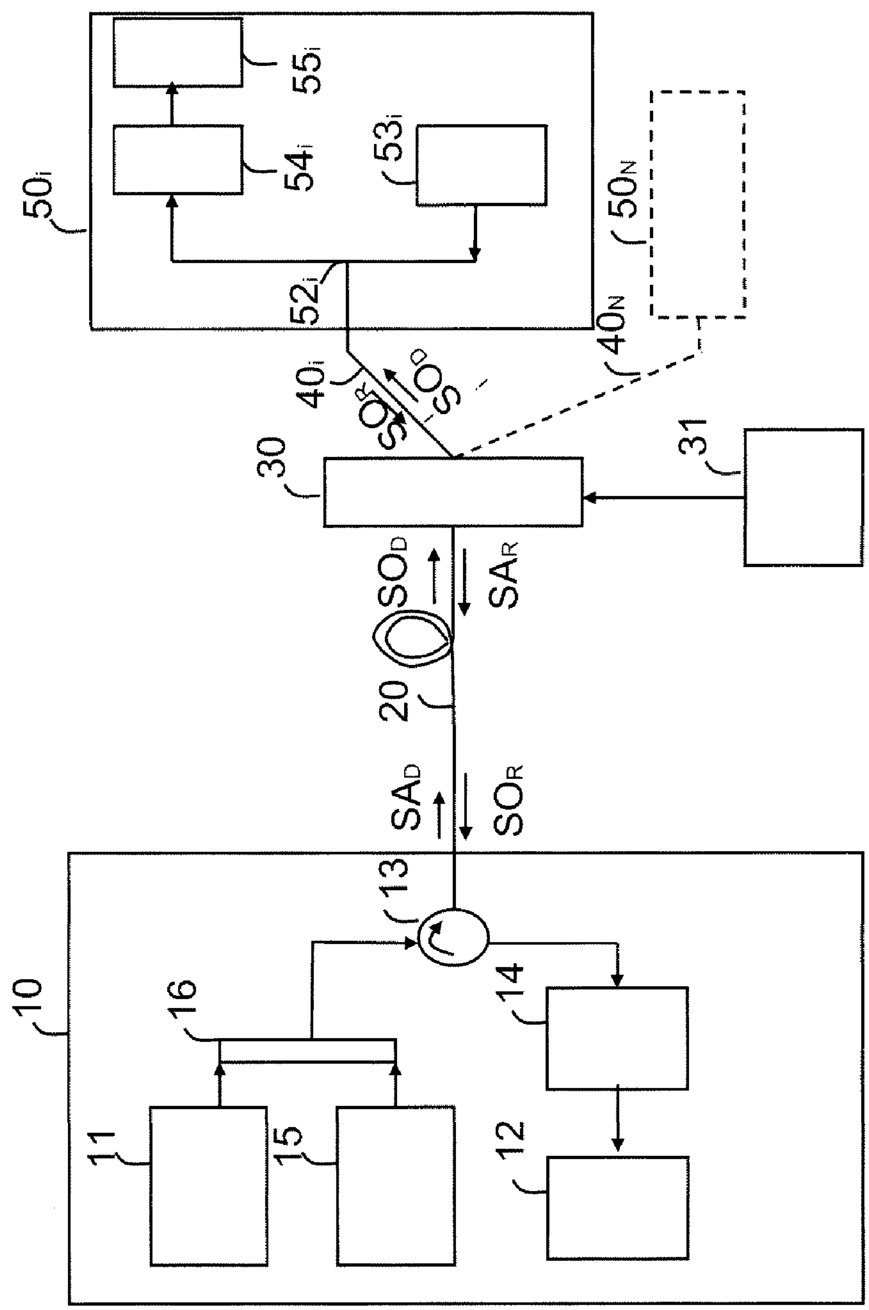
FIG. 4 diagrammatically presents a high bit rate passive optical access network according to the invention that also presents a long distance.

With reference to FIG. 4, a high bit rate, long haul passive optical network according to another aspect of the invention will now be presented. The component elements of the network that are common to the network described with reference to the preceding figures are given the same references and will not be described.

The optical exchange 10 comprises first means 15 of amplifying the optical power of the downlink optical signal, for example at least one laser diode, able to transmit a downlink amplification signal $SA_D$ in said optical fiber 40. This amplification signal is able to excite a first passive amplification medium, placed in the line fiber 40, so as to amplify the downlink optical signal $SO_D$. The expression "remote amplification" then applies. In this example, the amplification mode used is a distributed amplification or amplification based on the Raman effect. Such an amplification is distributed all along the line fiber 40. With this amplification mode, the first amplification medium is the line fiber itself.

The passive optical network 1 also comprises second means 31 of amplifying the optical power of the downlink optical signal $SO_D$, able to transmit a second uplink amplification signal $SA_R$ in said optical fiber. This second amplification signal is able to excite a second passive amplification medium, placed in the line fiber 40, so as to amplify the downlink $SO_D$ and uplink $SO_R$ optical signals.

In this example, the optical fiber also serves as the second amplification medium for the optical signals. Such an embodiment therefore makes it possible to amplify the uplink signals and the downlink signals in the same amplification medium based on the Raman effect.

More specifically, the amplification optical signals $SA_D$ and $SA_R$ transmitted respectively by the laser diodes 15 and 31 make it possible to excite the acoustic vibration modes (phonons) of the molecules of the silicon matrix $SiO_2$ of the optical fiber 20 forming the network. By reverting to their non-excited state, the molecules of the matrix of silica $SiO_2$ of the optical fiber 40 release energy by stimulated emission in the form of photons having the same wavelength as the downlink and uplink signals, which is therefore different from that of the amplification optical signals. Thus, by passing through the optical fiber whose molecules have been excited by the amplification optical signal, the optical data signal has its power amplified in a distributed manner upon its propagation in the fiber 20.

The wavelength of the amplification optical component is selected so that the wavelength of the photons emitted upon the return to the non-excited state of the molecules of silica of the optical fiber corresponds to the wavelength of the signal to be amplified. As an example, to amplify an optical data component with a wavelength of 1550 nanometers, the amplification optical component is transmitted at a wavelength of 1450 nanometers. For the downlink and uplink optical data signals transmitted by the optical exchange and the line termination devices, it is the amplification signal transmitted by the amplification means 15 and 31 which releases energy at the same wavelength as it.

It will be noted that there are two main techniques for transmitting the downlink and uplink optical signals, the first being TDM and the second being WDM, and that, depending on the selected transmission technology, the way the remote amplification is implemented will differ.

Let us first consider the first case of a passive access network implementing the TDM technology based on time division multiple access to the transmitted data. In other words, the optical exchange comprises a single laser diode 11 that transmits a downlink optical signal on a single wavelength, this wavelength being shared in time between the subscribers. In this case, the distribution element 30 is a 1-to-N coupler which divides the power of the downlink optical signal into N subsignals containing the same data, intended for the N line termination devices. It is then for the receiver of a line termination device 50*i* to extract the relevant data for the subscriber or subscribers, on the basis of a time sequencing.

In this first embodiment of a high bit rate, long haul passive optical network, the amplification means 15 and 31 transmit an amplification signal at a single wavelength, for example at 1450 nm for the downlink and uplink optical signals transmitted at the wavelength of 1550 nm.

In a second embodiment of a high bit rate, long haul passive optical network, the WDM technology is used, based on the distribution of the wavelength resources. In other words, a subscriber is allocated a wavelength. In this case, the line distribution element 30 is a 1-to-N optical multiplexer/demultiplexer which filters the downlink optical signal SOD and routes to a subscriber only the portion of this signal that concerns him and that, in the uplink direction, multiplexes the uplink signals transmitted, at different wavelengths, by the different line termination devices. Compared to the TDM passive network, the WDM access network is more costly, because it uses a greater number of wavelengths and a routing element. On the other hand, it is simpler to implement and offers subscribers greater security, because a wavelength is assigned to a subscriber and the optical demultiplexer attenuates the transmitted signal far less than the coupler does.

With a WDM access network, the amplification means 15 and 31 must generate amplification signals at least three different wavelengths, typically 1435, 1450 and 1465 nm, to ensure a flat gain over the entire C band.

It will also be noted that there is at least one alternative to Raman amplification. This is remote amplification by the insertion of an erbium-doped fiber section into the line fiber 20. Such a fiber section constitutes the amplification medium. By injecting an excitation wavelength into the erbium-doped fiber section, it is possible to amplify the optical data signal passing through this branch of the network. Such an amplification technique is called the ROPA (Remote Optically-Pumped Amplification) technique.

A single laser diode is needed to excite the erbium atoms present in the amplification medium, even in the case of a WDM access network. In effect, by returning to their state of equilibrium, the erbium atoms release photons at a plurality of wavelengths that are distinct but whose values constitute a range. Thus, if an optical signal has its data carried by a wavelength located in this range of values, it has its optical power amplified. When the network uses the wavelength division multiplexing, the optical data components transmitted by the optical exchange are associated with wavelengths included in a given range of values corresponding to the range of wavelength values that the erbium-doped fiber section is able to amplify.

It will be noted, finally, that it is possible to use both types of amplification in one and the same network, for example Raman amplification for the first medium (the line fiber 20) and ROPA amplification for the second medium, and vice versa.

The following two tables indicate, by way of example, the optical power budgets respectively in the downlink direction and in the uplink direction corresponding to a high bit rate, long haul passive optical network, of the order of 100 km, at 10 Gbit/s, in which the first and the second amplification media are the line fiber 20. The tables 1 and 2 relate to the case of a TDM network, whereas tables 3 and 4 relate to the case of a WDM network.

TABLE 1

| DOWNLINK DIRECTION | |
|---|---|
| Fiber losses at 1550 nm | 20 dB (SSMF) |
| Inline optical components | 15 dB (1:32 coupler); 8 dB (WDM multiplexer + circulators + 50/50 coupler + duobinary filter in the subscriber's home) |
| Power of the transmitter in the exchange | 3 dBm |
| Outbound Raman gain at 1550 nm | 20 dB |
| Power received on the subscriber's photodiode | −20 dBm |

TABLE 2

| UPLINK DIRECTION | |
|---|---|
| Fiber losses at 1550 nm return | 20 dB (SSMF) |
| Inline optical components | 15 dB (1:32 coupler); 8 dB (WDM multiplexer + circulators + 50/50 coupler + duobinary filter in the exchange) |
| Incoming power on the subscriber's retransmission module | −18 dBm |
| SOA gain in the subscriber's home | 20 dB |
| Return Raman gain at 1550 nm | 20 dB |
| Rayleigh backscattering on outbound fiber at 1550 nm | −30 dBm |
| Power received at the exchange | −21 dBm |

TABLE 3

| DOWNLINK DIRECTION | |
|---|---|
| Fiber losses at 1550 nm | 20 dB (SSMF) |
| Inline optical components | 5 dB (1:40 demultiplexer); 8 dB (WDM multiplexer + circulators + 50/50 coupler + duobinary filter in the subscriber's home) |
| Power of the transmitter in the exchange | 3 dBm |
| Outbound Raman gain at 1550 nm | 20 dB |
| Power received on the subscriber's photodiode | −10 dBm |

TABLE 4

| UPLINK DIRECTION | |
|---|---|
| Fiber losses at 1550 nm return | 20 dB (SSMF) |
| Inline optical components | 5 dB (1:40 demultiplexer); 8 dB (WDM multiplexer + circulators + 50/50 coupler + duobinary filter in the exchange) |
| Incoming power on the subscriber's retransmission module | −8 dBm |
| SOA gain in the subscriber's home | 20 dB |
| Return Raman gain at 1550 nm | 20 dB |
| Rayleigh backscattering on outbound fiber at 1550 nm | −30 dBm |
| Power received at the exchange | −1 dBm |

In these tables, it can be seen that the optical budgets corresponding to the downlink and uplink transmission directions are balanced. In the uplink direction, it will be observed that the value of the optical power received by the optical exchange 10 is greater than the power of the Rayleigh backscattering optical signal. Thus, the reception means placed in the optical exchange 10 are not dazzled by the backscattered signal and the reception of the uplink optical data components is not disturbed.

With one or other of these two embodiments, the invention therefore makes it possible to produce a high bit rate, long haul passive optical network that is robust to chromatic dispersion. As an example, the range obtained is of the order of 100 km, whereas the conventional passive access networks have a range limited to 20 km. This is made possible by the combination of two factors:

- the introduction of remote amplification means making it possible to amplify the transmitted optical signals while retaining the passive nature of the network; and
- the compensation for the chromatic dispersion, by the use of duobinary modulation on the reception modules both on the subscriber side and on the exchange side that is highly resistant to IES.

Such an increase in range notably makes it possible for a long haul access network according to the invention to serve on its own as both access network and collection network. One benefit is to eliminate an exchange that is generally located at the boundary between access network and collection network and one role of which is to amplify the transmitted optical signals.

Advantageously, the amplification means 31 can be placed in the position of this exchange and therefore benefit from shared power feed sources.

The invention claimed is:

1. A passive optical network comprising an optical exchange linked by one or more optical fibers including a single optical fiber to at least one line termination device of the network, wherein the optical exchange comprises:

means for transmitting a phase-modulated, NRZ-DPSK-formatted downlink optical data signal;

means for converting a phase-modulated, NRZ-DPSK-formatted uplink optical data signal into an amplitude-modulated, duobinary modulation-formatted uplink optical data signal; and means for receiving the amplitude-modulated, duobinary modulation-formatted uplink optical data signal, wherein the line termination device comprises:

coupling means for dividing the optical power of the phase-modulated, NRZ-DPSK-formatted downlink optical signal so as to obtain a first downlink optical signal and a second downlink optical signal, means for converting the first downlink optical signal into an amplitude-modulated, duobinary modulation-formatted downlink optical data signal;

means for receiving the amplitude-modulated, duobinary modulation-formatted uplink optical data signal; and means for generating the phase-modulated, NRZ-DPSK-formatted uplink optical data signal from the second downlink optical signal, and transmitting the phase-modulated, NRZ-DPSK-formatted uplink optical data signal, wherein the phase-modulated, NRZ-DPSK-formatted downlink optical data signal and the phase-modulated, NRZ-DPSK-formatted uplink optical data signal are both transmitted over the single optical fiber.

2. The passive optical network according to claim 1, wherein, the phase-modulated, NRZ-DPSK-formatted downlink optical data signal has a given basic bit rate, the conversion means of the optical exchange comprises a Gaussian filtering stage whose mid-height width falls within a range of values corresponding to a percentage of between 50 and 65% of said basic bit rate, the conversion means of the line termination device comprises a Gaussian filtering stage whose mid-height width falls within a range of values corresponding to a percentage of between 50 and 65% of said basic bit rate.

3. The passive optical network according to claim 1, wherein the generating and transmitting means comprises:

means for cleaning the phase of the second downlink optical signal;

means for amplifying the phase-cleaned second downlink optical signal;

phase-modulation means able to receive the phase-cleaned second downlink optical signal and supply the phase-modulated, NRZ-DPSK-formatted uplink optical data signal; and three-branch circulation means for receiving the second downlink optical signal over a first branch, sending the second downlink optical signal to the phase-cleaning means via a second branch, receiving the generated phase-modulated, NRZ-DPSK-formatted uplink optical data signal over a third branch, and sending the phase-modulated, NRZ-DPSK-formatted uplink optical data signal over the single optical fiber.

4. The passive optical network according to claim 1, wherein:

the optical exchange further comprises first amplifying means for amplifying the optical power of the phase-modulated, NRZ-DPSK-formatted downlink optical data signal, wherein the first amplifying means is able to transmit a downlink amplification signal in the single optical fiber;

the single optical fiber comprises at least one first passive amplification medium able to be excited by said first amplification signal;

the passive optical network comprises second means for amplifying the optical power of the downlink optical signal, able to transmit a second uplink amplification signal in said optical fiber; and the single optical fiber comprises a second amplification medium able to be excited by said second amplification signal.

5. An optical exchange linked one or more optical fibers including a single optical fiber to at least one line termination device in a passive optical network, the exchange comprising;

means for transmitting a phase-modulated, NRZ-DPSK-formatted downlink optical data signal;

means for converting a phase-modulated, NRZ-DPSK-formatted uplink optical data signal into an amplitude-modulated, duobinary modulation-formatted uplink optical data signal;

means for receiving the amplitude-modulated, duobinary modulation-formatted uplink optical data signal, wherein the phase-modulated, NRZ-DPSK-formatted downlink optical data signal and the phase-modulated, NRZ-DPSK-formatted uplink optical data signal are both transmitted over the single optical fiber.

6. In a passive optical network comprising an optical exchange the optical exchange comprising means for transmitting a phase-modulated, NRZ-DPSK-formatted downlink optical data signal and means for receiving phase-modulated, NRZ-DPSK-formatted uplink optical signal, a line termination device comprising:

coupling means for dividing the optical power of the phase-modulated, NRZ-DPSK-formatted downlink optical data signal so as to obtain a first downlink optical signal and a second downlink optical signal;

means for converting the first downlink optical signal into an amplitude-modulated, duobinary modulation-formatted optical data signal; and means for generating a phase-modulated, NRZ-DPSK-formatted uplink optical data signal from the second downlink optical signal, wherein the optical exchange and the line termination device are connected by one or more optical fibers including a single optical fiber, wherein the phase-modulated, NRZ-DPSK-formatted downlink optical data signal and the phase-modulated, NRZ-DPSK-formatted uplink optical data signal are both transmitted over the single optical fiber.

7. A method of transmitting a downlink optical data signal and of receiving an uplink optical data signal in a passive optical network comprising an optical exchange linked by one or more optical fibers including a single optical fiber to at least one line termination device of said network, the method comprising:

transmitting a downlink optical data signal phase-modulated in NRZ-DPSK format;

converting a phase-modulated, NRZ-DPSK formatted uplink optical data signal into an amplitude-modulated, duobinary modulation formatted uplink optical data signal; and receiving the amplitude-modulated, duobinary modulation-formatted uplink optical data signal, wherein the phase-modulated, NRZ-DPSK-formatted downlink optical data signal and the phase-modulated, NRZ-DPSK-formatted uplink optical data signal are both transmitted over the single optical fiber.

8. A method of receiving a downlink optical signal and transmitting an uplink optical data signal in a passive optical network comprising an optical exchange linked by one or more optical fibers including a single optical fiber to at least one line termination device of the network, the method comprising:

dividing the optical power of the transmitted downlink optical data signal so as to obtain a first downlink optical signal and a second downlink optical signal;

generating a phase-modulated, NRZ-DPSK-formatted uplink optical data signal from the second downlink optical signal;

transmitting the phase-modulated, NRZ-DPSK-formatted uplink optical data signal;

converting the format of the downlink optical data signal from a phase-modulated, NRZ-DPSK-format to an amplitude-modulated duobinary modulated format;

receiving the amplitude-modulated, duobinary-formatted downlink optical data signal, wherein the phase-modulated, NRZ-DPSK-formatted downlink optical data signal and the phase-modulated, NRZ-DPSK-formatted uplink optical data signal are both transmitted over the single optical fiber.

* * * * *